United States Patent
Nakazawa et al.

(10) Patent No.: US 6,650,709 B2
(45) Date of Patent: Nov. 18, 2003

(54) IMAGE DECODING DEVICE, IMAGE DECODING METHOD, AND STORAGE MEDIUM AND INTEGRATED CIRCUIT THEREOF

(75) Inventors: Takeshi Nakazawa, Tokyo (JP); Eiji Tsuboi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 458 days.

(21) Appl. No.: 09/770,246

(22) Filed: Jan. 29, 2001

(65) Prior Publication Data

US 2002/0031186 A1 Mar. 14, 2002

(30) Foreign Application Priority Data

Jan. 31, 2000 (JP) ........................................ 2000-023406

(51) Int. Cl.[7] ................................................. H04N 7/24
(52) U.S. Cl. ................................... 375/240.25; 386/109
(58) Field of Search ...................... 375/240.25; 386/109

(56) References Cited

U.S. PATENT DOCUMENTS 5,758,007 A * 5/1998 Kitamura et al. ............ 386/109
6,333,951 B1 * 12/2001 Tamura et al. ......... 375/240.25

* cited by examiner

Primary Examiner—Howard Britton
(74) Attorney, Agent, or Firm—Foley & Lardner

(57) ABSTRACT

A controller reads a header information, which is input from a picture information acquisition unit, stores the header information in a storage unit, and reads a frame rate code corresponding to picture data to be displayed from the storage unit according to displayed time information contained in the header information. Furthermore, the controller sets the dot clock frequency in response to the read frame frequency in a dot clock output unit, outputs a display control signal to an output unit in order to compare the currently set frame frequency and the frame frequency just prior to the currently set frame frequency. If both flags are not in agreement, then the controller outputs a display control signal to the output unit wherein the display control signal indicates a picture set by the frame rate which differs from the just prior frame rate, and commands the dot clock output unit to switch a dot clock.

12 Claims, 6 Drawing Sheets

FIG. 2

| INPUT INFORMATION | START CODE |
|---|---|
| Picture_start_code | 00 |
| Slice_start_code | 01~AF |
| User_data_start_code | B2 |
| Sequence_header_code | B3 |
| Sequence_error_code | B4 |
| Extension_start_code | B5 |
| Sequence_end_code | B7 |
| Group_start_code | B8 |

FIG. 3

| FRAME RATE CODE | FRAME FREQUENCY (Hz) |
|---|---|
| 0000 | forbidden |
| 0001 | 24000÷1001 (23.976···) |
| 0010 | 24 |
| 0011 | 25 |
| 0100 | 30000÷1001 (29.97···) |
| 0101 | 30 |
| 0110 | 50 |
| 0111 | 60000÷1001 (59.94···) |
| 1000 | 60 |
| ··· | reserved |
| 1111 | reserved |

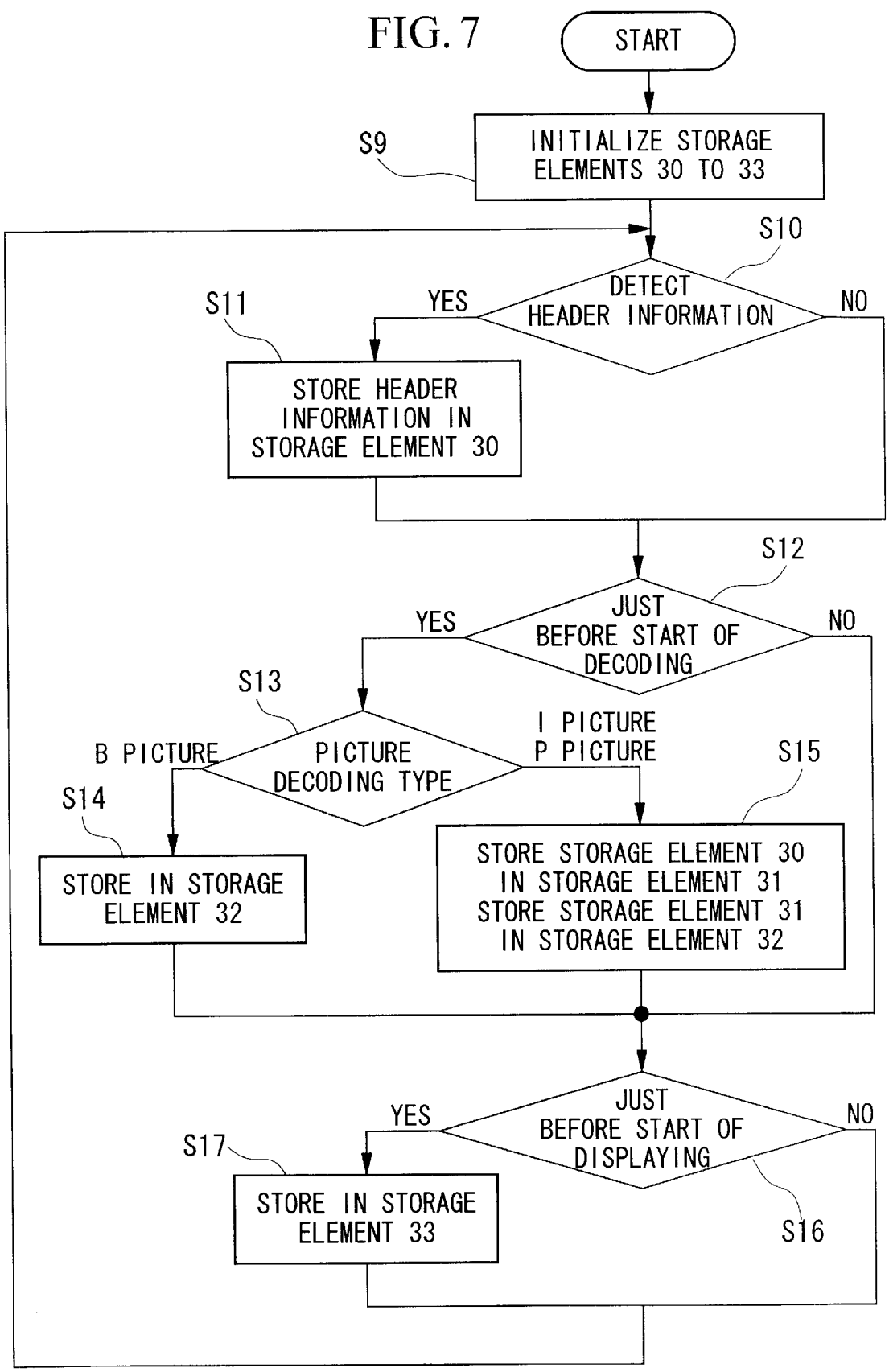

IMAGE DECODING DEVICE, IMAGE DECODING METHOD, AND STORAGE MEDIUM AND INTEGRATED CIRCUIT THEREOF

BACKGROUND OF THE INVENTION

1. Field of the Invention

The present invention relates to an image decoding device in which image data is output by switching a dot clock, an image decoding method, and a storage medium and an integrated circuit thereof.

2. Description of Related Art

Currently, in the MPEG standard, a frame rate, which is the frequency for displaying an image of a frame, such as 30 Hz/29.97 Hz, 60 Hz/59.94 Hz, or the like is permitted in the preparation of stream data having a difference in the thousandths. For example, when the frame rate included in the stream data is 29.97 Hz, in a television having an image decoding device which is set to a frame rate of 29.97 Hz, the image is displayed according to this frame rate.

When stream data having the frame rate of 30 Hz is input into the image decoding device which is set to the frame rate of 29.97 Hz or when stream data having the frame rate of 29.97 Hz is input into the image decoding device which is set to the frame rate of 30 Hz display frequency errors accumulate over time because the frequencies displaying an image differ from each other in the thousandths. In conventional image decoding devices, a part of the stream data which is input into the image decoding device is deleted or a repeat, a skip, and the like, of the image data to be displayed is performed in order to resolve these problems.

However, in conventional image decoding devices, as mentioned above, if the stream data having a frame rate which differs from the frame rate set in the image decoding device is input into the image decoding device, a part of the stream data is deleted or a repeat, a skip, and the like, of the image data to be displayed is performed therefore, the transmitted image cannot be accurately reproduced.

BRIEF SUMMARY OF THE INVENTION

In light of the above problem, an object of the present invention is to provide an image decoding device which smoothly displays images even if stream data having two or more different frame rates is input into the image decoding device.

To achieve the above object, the present invention provides an image decoding device in which encoded animation data is decoded and pictures are output in the order of displaying each picture according to decoded animation data, comprising: a frame rate information extracting means which extracts frame rate information corresponding to each picture contained in a stream from an input stream; a storing means which temporarily stores the frame rate information extracted by the frame rate information extracting means; a dot clock output means which outputs a dot clock in order to display images; and a control means which switches the frequency of the dot clock output by the dot clock output means when the output frame rate information stored in the storing means is read in the order of displaying each picture and when the dot clock of the arrayed frame rate information changes.

Furthermore, in the above image decoding device, the control means may switch the frequency of the dot clock output by the dot clock output means when the read frame rate information and the frame rate information which is read just prior to the read frame rate information are compared with each other and are found to be different.

Moreover, in the above image decoding device, the control means may switch the dot clock when a picture set by the frame rate information which differs from the just prior frame rate information is displayed.

The present invention further provides an integrated circuit device comprising an image decoding circuit which decodes encoded animation data and outputs pictures in the order of displaying each picture according to the encoded animation data, comprising: a frame rate information extracting means which extracts frame rate information corresponding to each picture contained in a stream from an input stream; a storing means which temporarily stores the frame rate information extracted by the frame rate information extracting means; a dot clock output means which outputs a dot clock in order to display images; and a control means which switches the frequency of the dot clock output by the dot clock output means when the output frame rate information stored in the storing means is read in the order of displaying each picture and when the dot clock of the arrayed frame rate information changes.

Furthermore, in the above integrated circuit device, the control means may switch the frequency of the dot clock output by the dot clock output means when the read frame rate information and the frame rate information which is read just prior to the read frame rate information are compared with each other and are found to be different.

Moreover, in the above integrated circuit device, the control means may switch the dot clock when a picture set by the frame rate information which differs from the just prior frame rate information is displayed.

The present invention further provides an image decoding method comprising an image decoding system which decodes encoded animation data and outputs pictures in the order of displaying each picture according to the encoded animation data, comprising the steps of: a frame rate information extracting step which extracts frame rate information corresponding to each picture contained in a stream from an input stream; a storing step which temporarily stores the frame rate information extracted by the frame rate information extracting step; a dot clock output step which outputs a dot clock in order to display images; and a control step which switches the frequency of the dot clock output by the dot clock output step when the output frame rate information stored in the storing step is read in the order of displaying each picture and when the dot clock of the arrayed frame rate information changes.

Furthermore, in the above image decoding method, the control step may switch the frequency of the dot clock output by the dot clock output step when the read frame rate information and the frame rate information which is read just prior to the read frame rate information are compared with each other and are found to be different.

Moreover, in the above image decoding method, the control step may switch the dot clock when a picture set by the frame rate information which differs from the just prior frame rate information is displayed.

The present invention further provides a storage medium, which is readable by a computer, storing an image decoding program for making a computer execute a decoding operation on encoded animation data and an outputting operation on pictures in the order of displaying each picture according to the encoded animation data, the image decoding program comprising the steps of: a frame rate information extracting step which extracts frame rate information corresponding to each picture contained in a stream from an input stream; a storing step which temporarily stores the frame rate information extracted by the frame rate information extracting step; a dot clock output step which outputs a dot clock in order to display images; and a control step which switches the frequency of the dot clock output by the dot clock output step when the output frame rate information stored in the storing step is read in the order of displaying each picture and when the dot clock of the arrayed frame rate information changes.

Furthermore, in the above storage medium, the control step may switch the frequency of the dot clock output by the dot clock output step when the read frame rate information and the frame rate information which is read just prior to the read frame rate information are compared with each other and are found to be different.

Moreover, in the above storage medium, the control step may switch the dot clock when a picture set by the frame rate information which differs from the just prior frame rate information is displayed.

As mentioned above, according to the present invention, since the frequency of the dot clock for displaying the image is switched when the frame rate information comprised in the stream corresponding to each picture is extracted from the input stream, the extracted frame rate information is temporarily stored, the output frame rate information which is stored in the order of displaying the picture information is arrayed, and the dot clock of the arrayed frame rate changes, even if stream data in which there are frame rates each having different frequencies, is input into the image decoding device, an effect can be obtained wherein images are smoothly displayed.

Furthermore, according to the present invention, since the dot clock is switched when pictures are displayed wherein the frame rate information which differs from the previous frame rate information is set, an effect can be obtained wherein the output image data is accurately reproduced.

BRIEF DESCRIPTION OF THE SEVERAL VIEWS OF THE DRAWING

FIG. 2 is a table showing the relationship between header information and the start code value.

FIG. 3 is a table showing the relationship between the frame rate code and the frame frequency.

FIG. 7 is a flowchart explaining the read and write operation of the header information.

DETAILED DESCRIPTION OF THE INVENTION

An image decoding device according to the first embodiment of the present invention will be explained with reference to the figures as follows.

Figure 1:
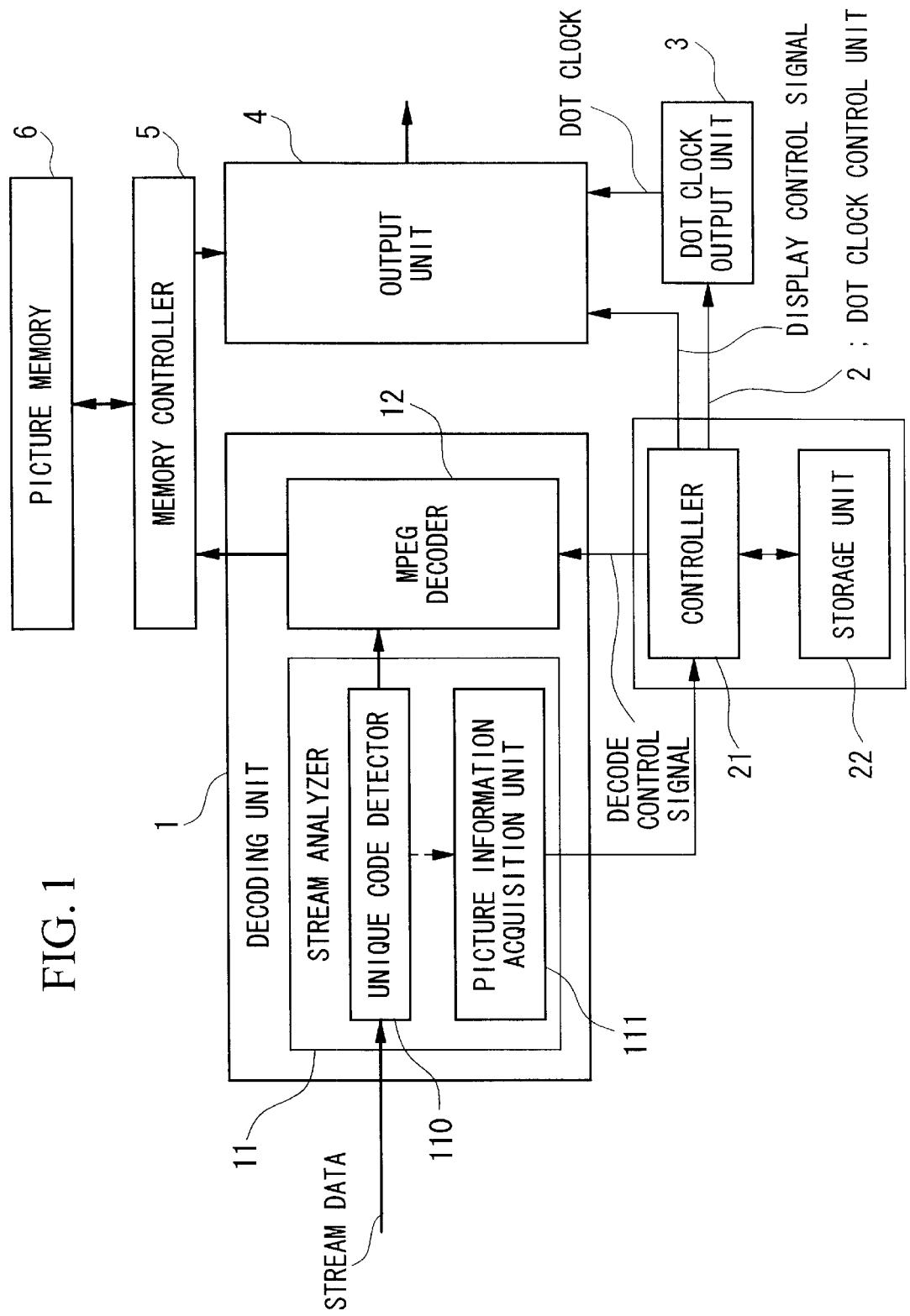
FIG. 1 is a block diagram showing a structure of an image decoding device according to the first embodiment of the present invention.

FIG. 1 is a block diagram showing a structure of the image decoding device according to the first embodiment of the present invention. In FIG. 1, a decoding unit 1 is composed of a stream analyzer 11 and an MPEG decoder 12, wherein the extraction of header information including frame rate and the like from stream data which is input from external units and the decoding of image information are performed. The stream analyzer 11 is composed of a unique code detector 110 and a picture information acquisition unit 111.

The unique code detector 110 senses, from the input stream data, a head part of header information such as a sequence header and a picture header which are stored in a sequence layer and detects what type of information has been input. That is, in the unique code detector 110, start code information shown in FIG. 2 is pre-stored as table information and what type of information has been input is detected according to a start code value coming after a unique code "0000 0000 0000 0000 0000 0001" in the input stream, and the pre-stored table information. For example, if data "B3" is input after the unique code, then "Sequence_Header_Code" is detected by the unique code detector 110. Furthermore, the unique code detector 110 outputs the input stream data to the MPEG decoder 12.

The picture acquisition unit 111 extracts the frame rate code (frame_rate_code), which comes after the "Sequence_Header_Code", according to the detection result by the unique code detector 110, and outputs the frame code to a controller 21.

A dot clock control unit 2 is composed of the controller 21 and a storage unit 22. The controller 21 switching-controls a dot clock output unit 3 in order to switch the frequency of the dot clock when a frame frequency which is an image displaying frequency changes according to the frame rate code output from the picture information acquisition unit 111. For example, as shown in FIG. 3, the controller 21 stores the frame frequency corresponding to the frame rate code as table information. If the input frame rate code is "0010", then the controller 21 detects the frame frequency as being 29.97 Hz according to this table information. Furthermore, the controller 21 stores header information including frame rate information which is output from the picture information acquisition unit 111 to the storage unit 22, rearranges the header information corresponding to the pictures in response to the arrangement of the pictures to be displayed, and switching-controls to the dot clock output unit 2 when the current frame rate and the previous frame rate are compared with each other and these rates are not the same (details of this operation will be explained later).

Furthermore, the controller 21 outputs a decode control signal, which controls the necessary information and timing in order to decode image information, to the MPEG decoder 12 according to header information output from the picture information acquisition unit 111. Moreover, the controller 21 outputs a display control signal, which controls the necessary information and timing in order to display picture data, to the output unit 4. The storage unit 22 temporarily stores header information output from the controller 21.

The dot clock output unit 3 supplies a dot clock as a clock in order to display an image in units of one pixel composing one picture to an output unit 4. Furthermore, the dot clock output unit 3 switches the frequency of the dot clock to be supplied to the output unit 4 according to the switching command of the frequency to be displayed from the dot clock control unit 2. The MPEG decoder 12 reproduces picture information by decoding I, P, and B pictures composing the encoded MPEG image information which is output as image information from the unique code detector 110. The timing of decoding is determined by the decode control signal output from the controller 21. A memory controller 5 stores picture data which is generated by the MPEG decoder 12 and outputs picture data in the order of displaying the pictures.

A picture memory 6 temporarily stores the decoded picture data. The output unit 4 reads the commanded picture by this display control signal via the memory controller 5 from the picture memory 6, synchronizes the commanded picture with the dot clock which is output from the dot clock output unit 3, and outputs the synchronized picture for each image to external units.

Next, the operation of the devices in the structure of FIG. 1 will be explained according to the time chart shown in FIG. 5. First, power is supplied to each unit and stream data is input into a decoding unit 1 in the order shown in FIG. 5 (I), so that the unique code detector 110 senses a unique code from the header of the stream data, detects the header information from the start code value coming after this unique code, and outputs the detected results into the picture information acquisition unit 111. Furthermore, the unique code detector 110 outputs the input stream data in sequence to the MPEG decoder 12.

The picture information acquisition unit 111 reads the frame rate code and the like included in the header information of the stream data according to the detected results of the unique code detector 110, and outputs the header information to the controller 21. The controller 21 stores the header information such as the frame rate code in the storage unit 22. Furthermore, the controller 21 outputs the decode control signal to the MPEG decoder 12 in response to whether the current processing time is within a predetermined period for the decoding process for a frame.

Figure 5:
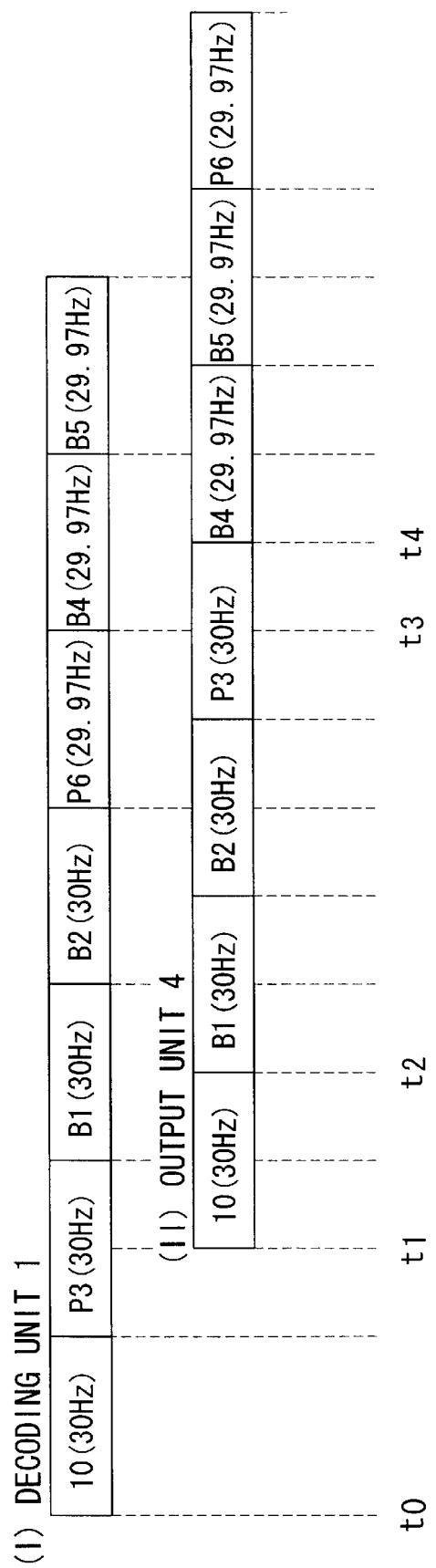
FIG. 5 is a timing chart explaining the operation of the image decoding device according to the first embodiment of the present invention.

The MPEG decoder 12 decodes I, P, and B pictures which are output from the unique code detector 110 and which are encoded, in the order of I0 pictures, P3 pictures, B1 pictures, B2 pictures, and P6 pictures, according to the decode control signal which is input from the controller 21 (FIG. 5 (I), time t0 to t3). Furthermore, the MPEG decoder 12 generates and outputs the picture data to the memory controller 5. The memory controller 5 stores the picture data, which is generated by the MPEG decoder 12, in the picture memory 6.

On the other hand, the controller 21 reads header information from the storage unit 22 in the order of displaying pictures according to whether the current processing time is within the predetermined period for the displaying process for a frame, and reads the frame frequency from the pre-stored table information according to the frame rate code included in the header information. Furthermore, the controller 21 sets the dot clock frequency in response to the read frame frequency in the dot clock output unit 3. For example, if the frame rate code "0101" is input, then the controller 21 sets the dot clock frequency corresponding to a frame frequency of 30 Hz, and outputs the display control signal to the output unit 4 according to whether the current processing time is within the predetermined period for the displaying process for a frame. Accordingly, the dot clock output unit 3 supplies the dot clock set by the controller 21 to the output unit 4.

The output unit 4 reads picture data of I0 pictures via the memory controller 5 from the picture memory 6 according to the display control signal which is output from the controller 21. The output unit 4 outputs picture data to external units in response to the dot clock supplied by the dot clock output unit 3 (FIG. 5 (II), time t1). Similarly, the output unit 4 reads the picture data in the order of B1 pictures, B2 pictures, and P3 pictures via the memory controller 5 from the picture memory 6 according to the display control signal input by the controller 21, and outputs the picture data to the external units in response to the dot clock supplied by the dot clock output unit 3 (FIG. 5, time t2 to t4).

On the other hand, the controller 21 reads the header information from the storage unit 22. If the frame rate code included in this header information is "0100", then the controller 21 reads the frame frequency from the pre-stored table information, sets the frequency of the dot clock corresponding to the read frame frequency of 29.97 Hz, and outputs the display control signal to the output unit 4 according to whether the current processing time is within the predetermined period for the displaying process. Accordingly, the dot clock output unit 3 supplies the dot clock set by the controller 21 corresponding to the frame frequency of 29.97 Hz to the output unit 4. The output unit 4 reads the picture data of B4 pictures via the memory control unit 5 from the picture memory 6 according to the display control signal which is output by the controller 21, and outputs the picture data in response to the dot clock which is supplied from the dot clock output unit 3 to external units (FIG. 5, time t4). Therefore, when a picture having a different frame frequency is displayed in place of a picture having the current frame frequency, the controller 21 commands the displaying of a picture which is set to this different frame rate information, switches the frame frequency, and controls the output from the output unit 4.

Figure 4:
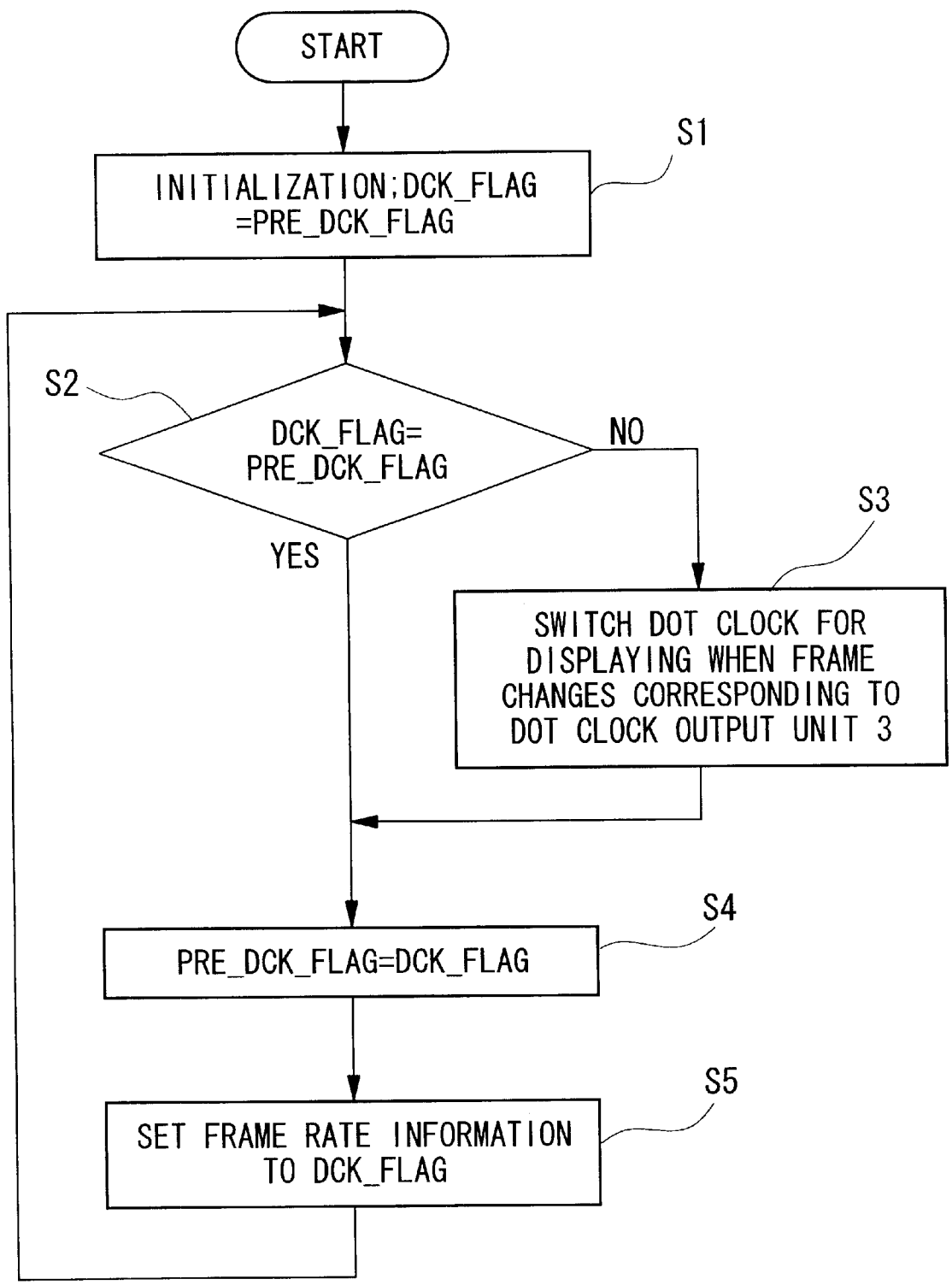
FIG. 4 is a flowchart explaining an operation wherein the frame frequency of the controller 21, shown in FIG. 1, is switched.

Next, the switching operation of the dot clock of the controller 21 according to the structure of FIG. 1 will be explained with reference to the flowchart of FIG. 4. First, after power is supplied to each unit, the controller 21 commands the storage unit 22 to store the header information which is output from the picture information acquisition unit 111 in the decoding unit 1. Furthermore, the controller 21 reads the header information corresponding to the picture data to be displayed on the first picture from the storage unit 22 according to whether the current processing time is within the predetermined period for the displaying process, and reads the frame information from the table information according to the frame rate code included in this header information. Subsequently, the controller 21 sets the frame rate information to the flag DCK_FLAG and the flag PRE_DCK_FLAG according to the frame rate code (in step S1). For example, if the frame rate code is "0101", then the controller 21 sets both the flag DCK_FLAG and the flag PRE_DCK_FLAG to "1". The controller 21 sets the dot clock frequency corresponding to this frame rate code (30 Hz) in the dot clock output unit 3, and outputs the display control signal to the output unit 4 in order to compare the flag DCK_FLAG and the flag PRE_DCK_FLAG (in step S2).

In this case, the flag DCK_FLAG and the flag PRE_DCK_FLAG are the same, so the controller 21 maintains the dot clock frequency and sets the flag DCK_FLAG to the flag PRE_DCK_FLAG (in step S4). Subsequently, the controller 21 reads the frame rate code of the header information of the picture to be displayed next and sets the frame rate code to the flag DCK_FLAG as frame rate information (in step S5). For example, if the frame rate code "0100", which indicates that flame frequency is 29.97 Hz, is input, then the controller 21 sets the flag DCK_FLAG to "0".

Next, the controller 21 compares whether the flag DCK_FLAG, which indicates the currently set frame rate information, and the flag PRE_DCK_FLAG, which indicates the frame rate information just prior to the currently set frame rate information, conform to each other (in step S2).

If both flags do not conform to each other, then the controller 21 outputs the display control signal to the output unit 4 wherein the display control signal indicates the picture set by the frame rate which differs from the just prior frame rate, and sets the frequency of the dot clock corresponding to the frame frequency of 29.97 Hz for the dot clock output unit 3 (in step S3). Accordingly, the output unit 4 outputs the picture data in response to the dot clock frequency according to the frame rate set in the picture.

Figure 6:
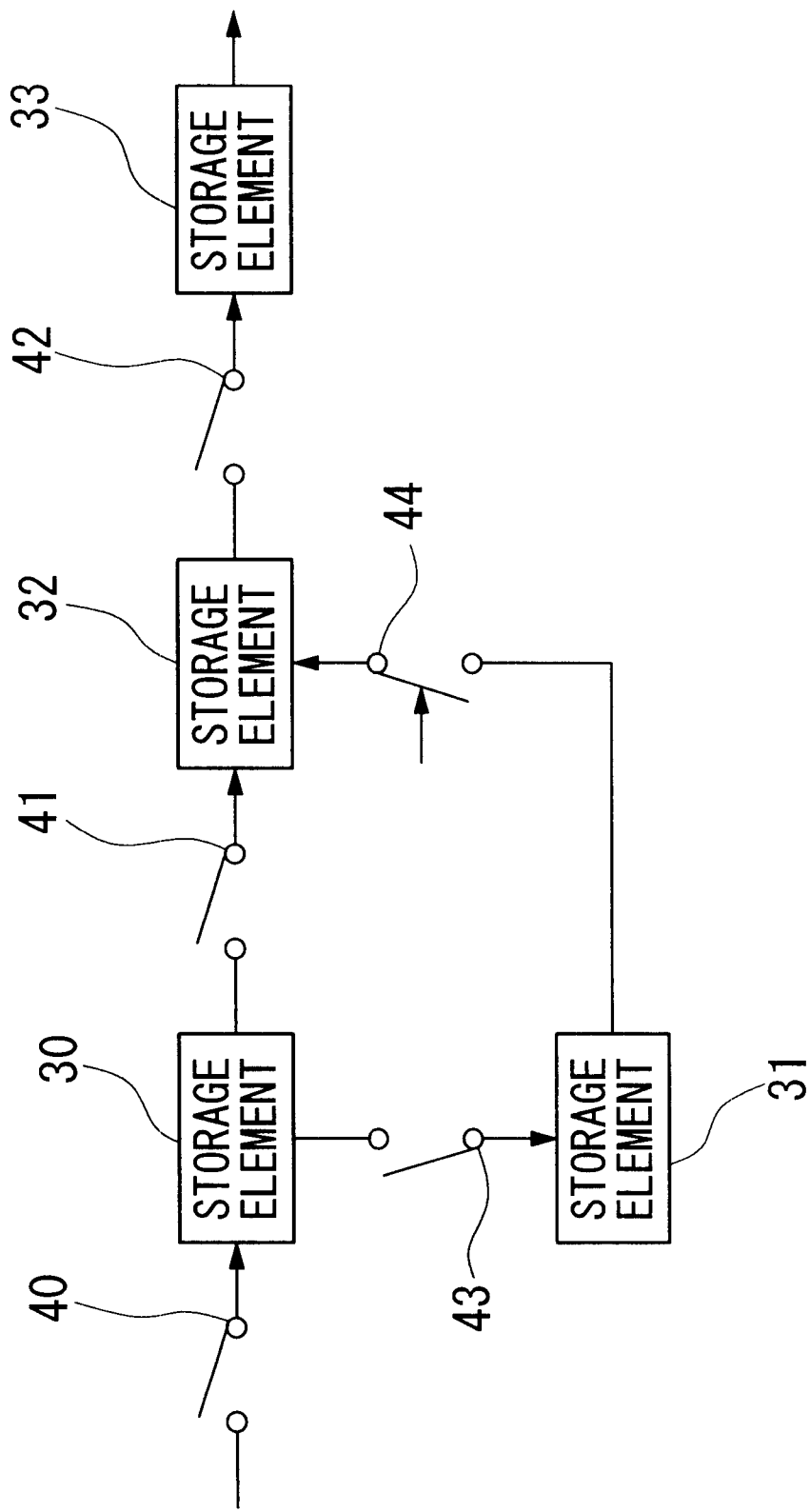
FIG. 6 is a block diagram showing the relationship between the controller 21 and a storage unit 22 shown in FIG. 1.

In the above-mentioned embodiment, the controller 21 reads header information from the storage unit 22 according to whether the current processing time is within the predetermined period for the displaying process for a frame and outputs the display control signal to the output unit 4. The read and write operations of the header information will be explained in detail with reference to the figures. FIG. 6 is a block diagram showing the relationship between the controller 21 and a storage unit 22. In FIG. 6, memory elements 30 to 33 compose the storage unit 22 and each stores header information. A switch 40 turns ON if header information is input into the controller 21. A switch 41, just before the start of decoding, turns ON if a B picture is decoded. A switch 42 turns ON just before the start of the display in units of frames. A switch 43 is for just before the start of decoding and turns ON if core picture (I picture or P picture) is decoded. A switch 44 is for just before the start of decoding and turns ON if core picture is decoded.

Next, the operation of each unit according to the configuration of FIG. 6 will be explained with reference to the flowchart of FIG. 7. First, after power is supplied to each unit, the controller 21 initializes the storage contents for each storage element 30 to 33 and deletes the storage contents (in step S9). After the stream data is input into the decoding unit 1, the header information is input from the picture information acquisition unit 111 to the decoding unit 1 (in step S10), so that the switch 40 turns ON, and header information, comprising picture information, frame rate information, and the like, is stored in the storage element 30 by the controller 21 (in step S11).

Next, the controller 21 detects whether the picture corresponding to the above-mentioned header information is for just before the start of decoding according to whether the current processing time is within the predetermined period for the decoding process for a frame (in step S12). If the picture is for just before the start of decoding, the controller 21 detects the picture decoding type, that is, whether the picture is a B picture according to this header information (in step S13). If the picture is not a B picture, the controller 21 commands switches 43 and 44 to turn ON and stores the header information, which is stored in the storage element 30, in the storage element 31 and the header information, which is stored in the storage element 31, in the storage element 32 (in step S15). If the picture is a B picture, the controller 21 commands the switch 41 to turn ON and stores the header information, which is stored in the storage element 30, in the storage element 32 (in step S14).

Next, the controller 21 detects whether the picture corresponding to the above-mentioned header information is for just before the start of the display according to whether the current processing time is within the predetermined period for the displaying process for a frame (in step S16).

If the picture is for just before the start of the display, the controller 21 commands the switch 42 to turn ON and stores the header information, which is stored in the storage element 32, in the storage element 33 (in step S17). Subsequently, the controller 21 determines the frequency of the dot clock corresponding to the frame frequency in the dot clock output unit 3 according to whether the current processing time is within the predetermined period for the displaying process for a frame and outputs the display control signal to the output unit 4.

When the next header information is input (in step S10), the controller 21 commands the switch 40 to turn ON and stores this header information in the storage element 30 (in steps S11). The controller 21 also detects whether the picture corresponding to this header information is for just before the start of decoding according to whether the current processing time is within the predetermined period for the decoding process for a frame (in step S12). If the picture is for just before the start of decoding, the controller 21 detects the picture decoding type, that is, whether the picture is a B picture according to this header information (in step S13).

If the picture is not a B picture, the controller 21 commands the switch 44 to turn ON and stores the header information, which is stored in the storage element 31, in the storage element 32, and further commands the switch 43 to turn ON and stores the header information, which is stored in the storage element 30, in the storage element 31 (in step S15).

The controller 21 detects whether the picture corresponding to this header information is for just before the start of the display according to whether the current processing time is within the predetermined period for the displaying process for a frame (in step S16). If the picture is for just before the start of the display, the controller 21 commands the switch 40 to turn ON when the header information is input and stores this header information in the storage element 30 (in step S11). The controller 21 also detects whether the picture corresponding to this header information is for just before the start of decoding according to whether the current processing time is within the predetermined period for the decoding process for a frame (in step S12).

If the picture is not in just before the start of decoding, the controller 21 detects the picture corresponding to whether this header information is for just before the start of the display according to whether the current processing time is within the predetermined period for the displaying process for a frame (in step S16). The controller also commands the switch 42 to turn ON when the picture is for just before the start of the display and stores the header information, which is in the storage element 32, in the storage element 33. Subsequently, the controller 21 determines the frequency of the dot clock corresponding to the frame frequency in the dot clock output unit 3 according to whether the current processing time is within the predetermined period for the displaying process for a frame and outputs the display control signal to the output unit 4. Accordingly, the header information of B pictures, I pictures, and P pictures is rearranged.

Furthermore, in order to actualize functions of the controller shown in FIG. 1, the program is stored in the storage medium which is readable by a computer, then the program, which is stored in the storage medium, is loaded and operated by a computer system so that the above-mentioned decoding process is performed. Moreover, the above-mentioned "computer system" comprises hardware such as an OS, peripheral units, and the like.

Additionally, the "computer system" comprises homepage distribution environments (or homepage display environments) if a WWW system is used.

Furthermore, the "storage medium which is readable by a computer" indicates portable media such as floppy disks, optical magnetic disks, ROMs, CD-ROMs, and the like, and storage devices, such as hard disks, which are located in the computer system, and the like. Moreover, the "storage medium which is readable by a computer" comprises a device which holds a program during a predetermined time, such as a volatile memory (RAM), in the computer system which can be a server or a client for the case when the program is sent via a network (communication network) such as the internet, or a communication network (communication line) such as a telephone line.

Furthermore, the above-mentioned program may be transmitted to another computer system via a transmitting medium or a transmitted wave in the transmitting medium from the storage unit in the computer system in which this program is stored or the like. Moreover, the "transmitting medium", which transmits programs, indicates a medium comprising a function which transmits information via networks (communication networks) such as the internet, or via communications networks (communications line) such as a telephone line.

Furthermore, the above-mentioned program may be used to actualize a part of the above-mentioned functions. Moreover, the above-mentioned program may be actualized by combining the above-mentioned functions and the program which is already held in the computer system, that is, the above-mentioned program may be a difference file (a difference program).

As mentioned above, the embodiment of the present invention is explained in detail with reference to the figures; however, the specific configuration is not limited to this embodiment and can comprise other designs which are within the scope of the present invention.

What is claimed is:

1. An image decoding device in which encoded animation data is decoded and pictures are output in the order of displaying each picture according to decoded animation data, comprising:
    a frame rate information extracting means which extracts frame rate information corresponding to each picture contained in a stream from an input stream;
    a storing means which temporarily stores the frame rate information extracted by the frame rate information extracting means;
    a dot clock output means which outputs a dot clock in order to display images; and
    a control means which switches the frequency of the dot clock output by the dot clock output means when the output frame rate information stored in the storing means is read in the order of displaying each picture and when the dot clock of the arrayed frame rate information changes.

2. An image decoding device according to claim 1, wherein the control means switches the frequency of the dot clock output by the dot clock output means when the read frame rate information and the frame rate information which is read just prior to the read frame rate information are compared with each other and are found to be different.

3. An image decoding device according to claim 1, wherein the control means switches the dot clock when a picture set by the frame rate information which differs from the just prior frame rate information is displayed.

4. An integrated circuit device comprising an image decoding circuit which decodes encoded animation data and outputs pictures in the order of displaying each picture according to the encoded animation data, comprising:
    a frame rate information extracting means which extracts frame rate information corresponding to each picture contained in a stream from an input stream;
    a storing means which temporarily stores the frame rate information extracted by the frame rate information extracting means;
    a dot clock output means which outputs a dot clock in order to display images; and
    a control means which switches the frequency of the dot clock output by the dot clock output means when the output frame rate information stored in the storing means is read in the order of displaying each picture and when the dot clock of the arrayed frame rate information changes.

5. An integrated circuit device according to claim 4, wherein the control means switches the frequency of the dot clock output by the dot clock output means when the read frame rate information and the frame rate information which is read just prior to the read frame rate information are compared with each other and are found to be different.

6. An integrated circuit device according to claim 4, wherein the control means switches the dot clock when a picture set by the frame rate information which differs from the just prior frame rate information is displayed.

7. An image decoding method comprising an image decoding system which decodes encoded animation data and outputs pictures in the order of displaying each picture according to the encoded animation data, comprising the steps of:
    a frame rate information extracting step which extracts frame rate information corresponding to each picture contained in a stream from an input stream;
    a storing step which temporarily stores the frame rate information extracted by the frame rate information extracting step;
    a dot clock output step which outputs a dot clock in order to display images; and
    a control step which switches the frequency of the dot clock output by the dot clock output step when the output frame rate information stored in the storing step is read in the order of displaying each picture and when the dot clock of the arrayed frame rate information changes.

8. An image decoding method according to claim 7, wherein the control step switches the frequency of the dot clock output by the dot clock output step when the read frame rate information and the frame rate information which is read just prior to the read frame rate information are compared with each other and are found to be different.

9. An image decoding method according to claim 7, wherein the control step switches the dot clock when a picture set by the frame rate information which differs from the just prior frame rate information is displayed.

10. A storage medium which is readable by a computer, storing an image decoding program for making a computer execute a decoding operation on encoded animation data and an outputting operation on pictures in the order of displaying each picture according to the encoded animation data, the image decoding program comprising the steps of:
    a frame rate information extracting step which extracts frame rate information corresponding to each picture contained in a stream from an input stream;
    a storing step which temporarily stores the frame rate information extracted by the frame rate information extracting step;
    a dot clock output step which outputs a dot clock in order to display images; and a control step which switches the frequency of the dot clock output by the dot clock output step when the output frame rate information stored in the storing step is read in the order of displaying each picture and when the dot clock of the arrayed frame rate information changes.

11. A storage medium according to claim 10, wherein the control step switches the frequency of the dot clock output by the dot clock output step when the read frame rate information and the frame rate information which is read just prior to the read frame rate information are compared with each other and are found to be different.

12. A storage medium according to claim 10, wherein the control step switches the dot clock when a picture set by the frame rate information which differs from the just prior frame rate information is displayed.

* * * * *